United States Patent [19]

Guerriero et al.

[11] 4,411,760
[45] Oct. 25, 1983

[54] ELECTROLYTIC CELLS

[75] Inventors: Renato Guerriero; Italo Vittadini, both of Mestre, Italy

[73] Assignee: SAMIM Societa Azionaria Minero Metallurgica S.p.A., Rome, Italy

[21] Appl. No.: 263,207

[22] Filed: May 13, 1981

[30] Foreign Application Priority Data

May 26, 1980 [IT] Italy .............................. 22313 A/80

[51] Int. Cl.³ .......................... C25C 7/00; C25C 1/16; C25C 7/02
[52] U.S. Cl. .................................... 204/270; 204/114; 204/277; 204/286; 204/DIG. 1; 204/278
[58] Field of Search ................ 204/114, 270, 277–278, 204/288–289, 286, 265, DIG. 1

[56] References Cited

U.S. PATENT DOCUMENTS

| | | | |
|---|---|---|---|
| 1,801,011 | 4/1931 | Koeppen | 204/278 |
| 2,439,491 | 4/1948 | Schiffl | 204/277 |
| 3,790,465 | 2/1974 | Giacopelli et al. | 204/270 X |
| 3,959,111 | 5/1976 | Mardine et al. | 204/265 X |
| 4,075,069 | 2/1978 | Shinohara et al. | 204/278 X |
| 4,155,821 | 5/1979 | Grontoft | 204/266 X |
| 4,224,131 | 9/1980 | Acero et al. | 204/278 X |
| 4,330,380 | 5/1982 | Parkinson et al. | 204/266 X |

FOREIGN PATENT DOCUMENTS 2704470 9/1978 Fed. Rep. of Germany ...... 204/278

Primary Examiner—Donald R. Valentine
Attorney, Agent, or Firm—Hedman, Casella, Gibson, Costigan & Hoare

[57] ABSTRACT

To solve pollution problems in electrolytic cells for the production of zinc by electrolyzing a solution of a zinc salt, shielding baffles are provided above the cell anodes, the gap between adjoining baffles being such as to provide a satisfactory tight seal while permitting the evacuation of noxious gases and mists through manifolds formed through the cell walls.

5 Claims, 4 Drawing Figures

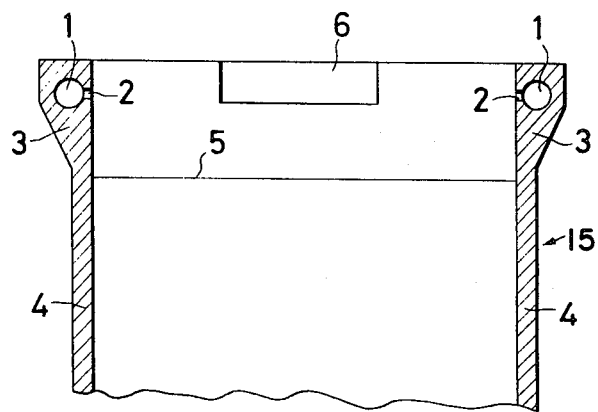
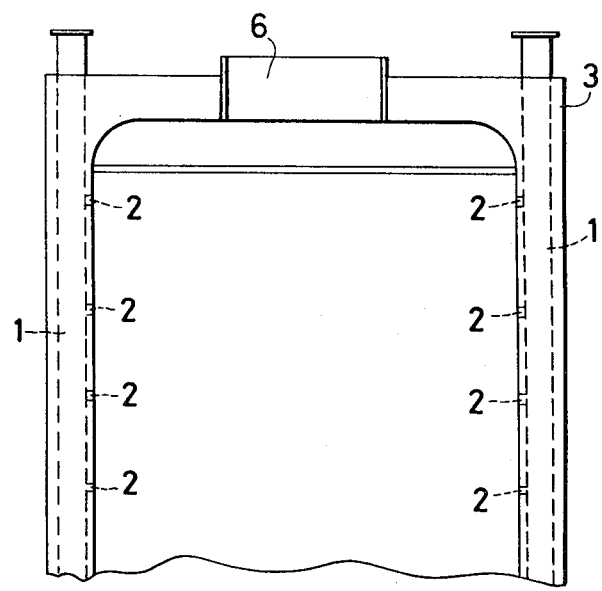

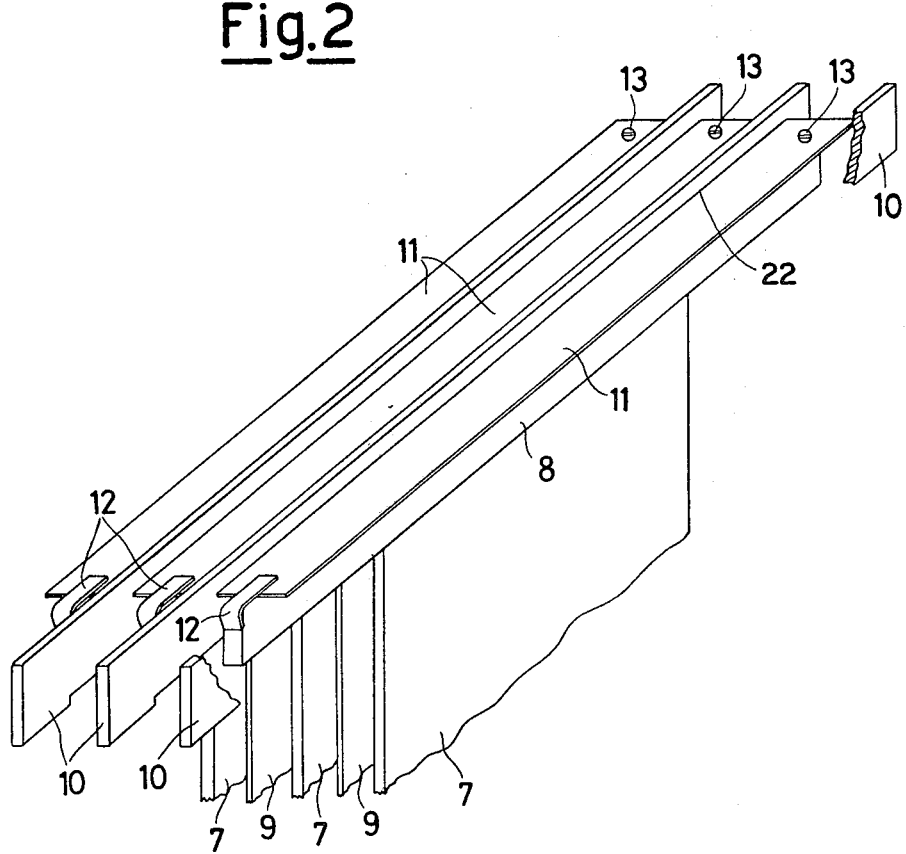

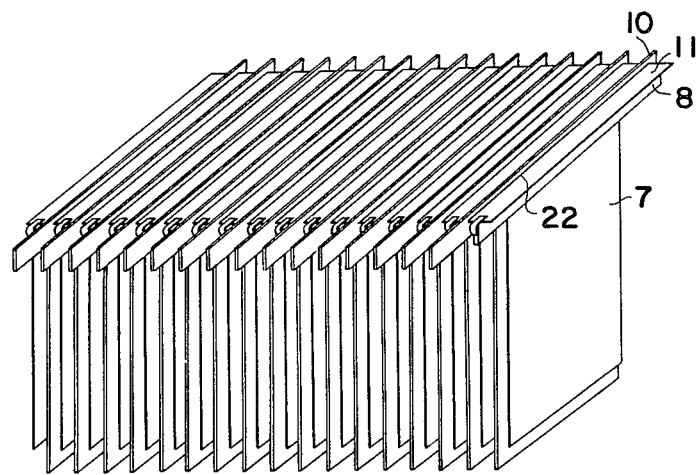
Fig.3
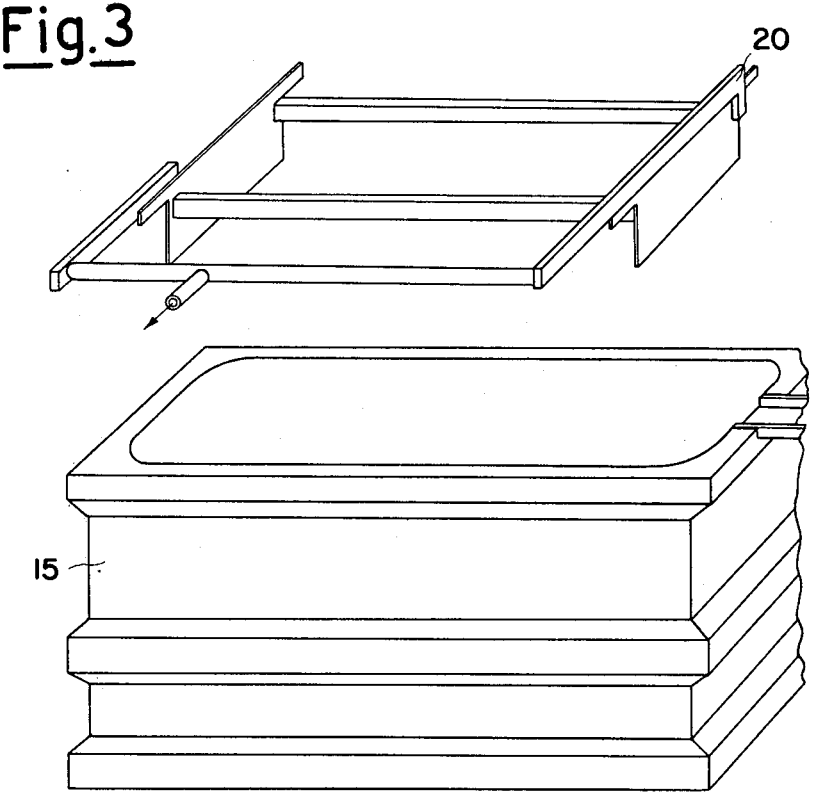

ELECTROLYTIC CELLS

This invention relates to the industrial electrolytic cells and more particularly to the electrolytic cells used for the production of zinc. This invention is for an improvement in such electrolytic cells and can be used for a number of electrolytic processes in which gases are evolved, but particularly for the processes for the electrolytic production of zinc.

In this specification, special reference will be made to the production of zinc, it being understood that the invention can be applied with advantage to other industrial electrolytic processes.

It is known that the process for producing primary zinc includes a number of stages in which a high-purity acidic solution of a zinc salt, generally zinc sulphate, is produced which is reduced in the final stage to metallic zinc by electrolysis.

Such electrolytic cells have vats in which there are numerous opposing anodes and cathodes. As a rule, the anodes are of lead and the cathodes are of aluminium. Metallic zinc is deposited on the cathode and forms a thin sheet, which is removed from time to time by stripping, generally requiring the intervention of operators. The inter-electrode gaps between the adjoiningly arranged electrodes must be reduced as far as practicable in order to limit the voltage drop through the solution, which is proportional to the inter-electrode gap. Also the electrodes must be rigorously parallel to each other to obtain an even deposit on the entire cathode surface and a well formed zinc sheet.

The primary and secondary reactions which take place in such an electrochemical reactor are as follows:

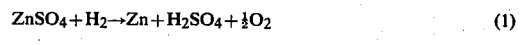

$$ZnSO_4 + H_2 \rightarrow Zn + H_2SO_4 + \tfrac{1}{2}O_2 \qquad (1)$$

$$H_2O \rightarrow H_2 + \tfrac{1}{2}O_2 \qquad (2)$$

$$Zn + H_2SO_4 \rightarrow ZnSO_4 + H_2 \qquad (3)$$

The first two reactions take place concurrently and the definite predominance of the reaction (1), i.e. the primary reaction, over the reaction (2) determines the electrical yield of the reactor.

The dissolution reaction (3) may take place accidentally when the supply of electricity is discontinued. The reactions (2) and (3) may take place either due to chemical reasons, such as the inadequate purification of the electrolyte, and/or for physical reasons, such as temperature.

An effect of the evolution of gas, it being considered a "normal"-production of gaseous oxygen according to the reaction (1), or "abnormal"-production of hydrogen according to the reactions (2) and (3), is the formation of acidic mists.

This phenomenon is the result of the formation of tiny droplets of acidic solution which, especially under "abnormal" electrolysis conditions, are entrained away from the bath surface and carried convectively airborne in the environment.

Another undesirable effect is experienced when the working conditions are "abnormal" and result in the formation of localized explosive mixtures.

Under "normal run" conditions, the content of mists in an electrolysis cell room is around a few milligrams per normal cubic meter of air, in terms of sulphuric acidity. Under "abnormal" conditions, this value is raised to definitely higher values.

The stripping of the zinc cathodes takes place at preselected time intervals, generally 24 to 48 hours, and is carried out mechanically. This operation requires the attendance of operators near the cells so that the operators are exposed to the aggressively polluted environment.

This exposure, in the long run, brings about alteration of the nasal sept, the oral cavity, the teeth and the respiratory tract in general.

Such an environment, moreover, attacks the machinery, the implements and the building structure of the cell rooms, so that they must be built with special precautions.

Attempts have been made to overcome these shortcomings by purifying the work environment with forced ventilation, with a total renewal of air from 5 to 10 times in an hour. This procedure, however, involves a number of drawbacks, such as:

production of strong air streams difficulty in air-conditioning, especially for installations in cold areas, and considerable waste of power.

An object of the present invention is to offset these defects, thus preventing the pollution of the environment in the electrolytic cell room.

Another object of the present invention is to directly withdraw the polluting gases as they are being produced.

These and other objects of this invention are achieved by the improved electrolytic cells to be described hereinafter and shown in the figures of the accompanying drawings, wherein:

FIG. 1 is a diagrammatic cross sectional view of the vat;

FIG. 1B is a plan view of the vat of FIG. 1;

FIG. 2 illustrates the configuration of the assembled electrodes; and

FIG. 3 is an overall exploded view of the assembly.

The electrolytic cells according to the invention generally includes a vat or container made with suction manifolds formed through the top edges of the vat at a level immediately above the free surface of the electrolyte. These manifolds have suction ports which directly withdraw from the air chamber overlying the free level of the electrolyte the gases which are evolved therefrom.

In FIG. 1A there is diagrammatically shown the cross-sectional view of the container or vat 15, wherein the manifolds 1 are indicated together with the ports 2, as formed through an enlargement 3 of the top portion of the sidewall 4.

The electrolyte level is shown at 5. As an alternative, the manifold can be provided on one side of the vat 15 only. An overflow is indicated at 6.

In FIG. 1B the vat is shown in plan view.

The sets of anodes 7 and cathodes 9 are immersed in the vat 15 in alternate sequence and rest on the supporting members 20 provided on the top edge of the cell (FIG. 3). The cell is covered by a set of baffles 11, secured along the entire anode length and cut out in correspondence of the centre line of the inter-anode gaps 22, to correspond with the working positions of the cathodes.

The empty space so provided, facilitates removal and replacement of the cathodes for performing the operations of stripping the deposited zinc layer, and provides a reference which is useful for correct positioning and immediate checking of the electrode alignment.

The configuration of the assembled electrode set is shown in FIG. 2, wherein 7 indicates the anodes and 8 the relative bus bar which rests on its supports 20 (FIG. 3), whereas 9 and 10 are the cathodes and their relative bus bar, respectively which also rest on support 20.

The shielding baffles 11 are secured to the bars 8 by spring members 12 and/or with screws 13.

The baffles preferably are made of a resilient material to provide a satisfactory tightness while not hindering the cathode-moving operations. The baffles in question can also be fastened in other ways, such as by forming a set of grooves through the horizontal top surfaces of the bars 8, while the baffles 11 have projections which match with the grooves. The assembly of all of the baffles isolates a space above the electrolyte from which evolved gas and acidic mists formed concurrently therewith can be drawn.

The suction manifolds are connected to a main suction duct, to which, in turn, a conventional suction system is connected, equipped with electric exhausters and/or ejectors.

The electrolytic cells according to the invention overcome the aforementioned drawbacks aforementioned since the withdrawal of the acidic mists is effected with small volumes of sucked air and with a small consumption of power, so that air-conditioning of the cell room is not a problem.

In addition, the cells of the invention recover, if desired, an oxygen-enriched atmosphere. The drawn gases and mists can be dispersed into the atmosphere through a chimney in a diluted state so that the exhaust gases are harmless. Alternatively, a gas-abating system can be provided, to be used at least when "abnormal" reaction conditions are under way.

If electric exhausters are used, it is preferred that the moving members have anti-explosion bearings.

The negative pressure used for drawing the air overlying the electrolyte is up to 15 mm of water column. This value is correlated to the tight seal provided by the baffles. When the absolute values of the negative pressure are too low, they do not afford adequate exhaustion, whereas when the values are too high useless air is drawn through the suction gaps, which dilutes the gases being drawn without any advantage while requiring a higher power consumption. Whenever a system for abating the drawn out gases is provided, the suction system is subjected to additional pressure drops.

In order that the significance and the advantages of the invention may be better understood, the TABLE reported below provides working data obtained in a test cell.

| Run conditions | Composition of the atmosphere within the cell | | |
|---|---|---|---|
| | Increase $O_2$ % by vol. | $H_2$ content mg/nor.m$^3$ | $H_2SO_4$ content mg/nor.m$^3$ |
| normal | +1.0 | 300 | 1.0 |
| normal | +2.0 | 250 | 0.8 |
| irregular | +2.0 | 550 | 3.0 |
| irregular | +1.2 | 700 | 7.0 |
| irregular | +2.0 | 1000 | 15.0 |
| irregular | +3.0 | 400 | 5.0 |

By maintaining a suction of 150 nor.m$^3$ an hour in the device located in the internal edge of the vat no detectable alterations of the composition of the air in the cell room have been experienced.

The cells according to the invention can be built with conventional materials such as coated or protected cement, resistant plastics materials, such as reinforced polyvinyl chloride PVC°, or in resin-glass. Air ports, manifolds and suction fittings can be inserted in the body of the cell during construction or they can be prepared separately and subsequently applied to the cell.

In the former case, however, the ribs derived from the insertion of such members in the structure of said elements cooperate to increase the sturdiness and the stiffness of the structures.

The suction manifolds also can form the supporting structure for the electrodes.

An overall exploded view of the assembly is shown in FIG. 3.

A possible alternative to the suction system with negative pressures is that of pressurizing the entire cell room to a value slightly above atmospherical so as to prevent the flow of gas from the space overlying the electrolyte level to the environment, but in such a way that the reverse flow from the cell room environment to the space above the electrolyte and the flow towards the manifolds are prevented.

Such an approach, which is doubtless more intricate, might be more prudential and thus it could be preferred for particular electrochemical processes in the electroplating industry.

We claim:

1. An electrochemical cell having an electrolyte-containing container and a set of spaced anodes and cathodes arranged in alternate sequence and serially connected, comprising:

bus bars for the anodes and cathodes, wherein the anodes and cathodes depend directly from said bars, a support structure at the top of the container and about its perimeter upon which said bus bar rest so that said bars are at the top of the container with the anodes and cathodes depending directly therefrom into the electrolyte, a plurality of shielding baffles which are resilient and which are secured to the top of said bus bars for the anodes, said baffles extend over and from both sides of the bus bars into the space between anodes to form gaps therebetween in which said cathode bus bars are positioned, and wherein said baffles and cathode bus bars isolate the space immediately above the electrolyte, and said baffles, due to their resiliency and inter anode gaps, allow removal and replacement of the cathode while they remain secured to the anodes, a suction manifold connected to said tub having a plurality of ports spaced along its length and open to the space between said baffles and electrolyte for drawing gases and mists therefrom, and suction means connected to said manifold which effect a negative pressure in said manifold relative to the pressure in the room to draw out gases and mists which evolve in the electrochemical reaction from said space and through said ports to prevent their diffusion into the room.

2. An electrochemical cell according to claim 1, for the electrochemical production of zinc.

3. An electrochemical cell according to claim 1, wherein said suction manifold and said plurality of suction ports are arranged along the longitudinal axis of the tub and said anodes and cathodes are arranged along the transverse axis of the tub.

4. An electrochemical cell according to claim 1, wherein said suction manifold and the plurality of suction ports are arranged along the longitudinal axis of the container and said anodes and cathodes are arranged along the transverse axis of the container.

5. An electrochemical cell according to claim 1 wherein the suction of gases present in the space overlying the electrolyte is effected by pressurizing the cell room environment under a pressure slightly exceeding atmospherical pressure.

* * * * *